United States Patent
Klasson et al.

(10) Patent No.: US 8,612,056 B2
(45) Date of Patent: Dec. 17, 2013

(54) METHOD OF CONFIGURING A HOME AUTOMATION INSTALLATION

(75) Inventors: Mattias Klasson, Lerum (SE); Samuel Spanberger, Floda (SE); Tommy Carlsson, Gothenburg (SE); Christian Magnusson, Savedalen (SE)

(73) Assignee: Somfy SAS, Cluses (FR)

( * ) Notice: Subject to any disclaimer, the term of this patent is extended or adjusted under 35 U.S.C. 154(b) by 335 days.

(21) Appl. No.: 13/014,516

(22) Filed: Jan. 26, 2011

(65) Prior Publication Data

US 2011/0184561 A1 Jul. 28, 2011

(30) Foreign Application Priority Data

Jan. 28, 2010 (FR) ...................................... 10 50599

(51) Int. Cl.
*G06F 19/00* (2011.01)

(52) U.S. Cl.
USPC .......................... 700/279; 160/120; 318/264

(58) Field of Classification Search
USPC .................... 700/279, 79; 326/276; 162/168; 318/264, 265, 266; 160/120
See application file for complete search history.

(56) References Cited

U.S. PATENT DOCUMENTS

| | | | |
|---|---|---|---|
| 4,644,990 A * | 2/1987 | Webb et al. | 160/5 |
| 4,665,965 A * | 5/1987 | Pasquier et al. | 160/310 |
| 5,565,855 A * | 10/1996 | Knibbe | 340/3.51 |
| 1,410,360 A1 | 12/2004 | Gauthier et al. | |
| 7,034,899 B2 | 4/2006 | Symoen et al. | |
| 7,147,164 B1 * | 12/2006 | Burma | 235/472.02 |
| 7,401,867 B2 * | 7/2008 | Riddiford et al. | 303/20 |
| 7,538,504 B2 * | 5/2009 | D'Ayot | 318/280 |
| 7,588,067 B2 * | 9/2009 | Veskovic | 160/5 |
| 7,755,505 B2 * | 7/2010 | Johnson et al. | 340/9.16 |
| 7,931,068 B2 * | 4/2011 | Carmen et al. | 160/120 |
| 2004/0267909 A1 * | 12/2004 | Autret | 709/220 |

FOREIGN PATENT DOCUMENTS

| | | |
|---|---|---|
| DE | 20 2005 0196 992 U | 5/2007 |
| EP | 1 576 430 A | 9/2005 |
| EP | 1274 199 B | 5/2007 |
| WO | WO 03/007265 A1 | 1/2003 |
| WO | WO 03/107105 A2 | 12/2003 |
| WO | WO 03/107105 A3 | 12/2003 |

OTHER PUBLICATIONS

Kastner et al., Communication System for Building Automation and Control, Jun. 2005, IEEE, vol. 93, No. 6, p. 1178-1203.*

Search Report issued by European Patent Office for priority application FR 10 50599 dated Sep. 28, 2010.

* cited by examiner

*Primary Examiner* — Kidest Bahta

(74) *Attorney, Agent, or Firm* — Frommer Lawrence & Haug LLP; Ronald R. Santucci

(57) ABSTRACT

Method of configuring a home automation installation comprising a plurality of mobile screens driven by actuators identified by an identifier, the method comprising the following steps:
  a) a step of constructing a first list of identifiers of actuators of the installation,
  b) a step of locating all the locations of the screens that make up the part of the installation to be configured,
  c) a step of associating a list of possible actuator identifiers with each screen location,
  d) a step of transmitting a movement control command to each actuator of a group of actuators,
  e) a step of designating locations that correspond to a group of screens that have reacted to the control command,
  f) a step of updating the lists of possible actuator identifiers for each location,
the steps d) to f) being reiterated as long as at least one list of possible actuator identifiers for a screen location comprises more than one actuator identifier.

15 Claims, 4 Drawing Sheets

METHOD OF CONFIGURING A HOME AUTOMATION INSTALLATION

This application claims priority to French Patent Application Number 10 50599 filed Jan. 28, 2010, the disclosure of which is herein incorporated by reference.

The invention relates to the field of buildings and more particularly so-called dynamic façades, comprising mobile and adjustable motor-driven solar protection screens.

Dynamic façades are used to ensure light comfort in the building and to produce energy savings by regulating the heat build-up through the openings of the façade. The screens may be indoor blinds, for example venetian blinds with orientable slats, or roller blinds, or external screens, orientable rigid panels, etc. A number of screens may be situated at one and the same opening.

At each opening equipped with one or more screens, actuators drive the movement of these mobile screens in rotation or in translation. The actuators are managed centrally at room level, floor level, at the level of the façade to which they belong or simply at building level. A central control means also recovers some information from various sensors positioned inside and outside the building (presence, temperature, brightness, and other such sensors).

Each actuator may also be driven individually or in a group via a local control point.

Each actuator is identified by a code or identifier which is specific to it. To make it possible to configure the links between the central control means and the actuators, or between a local control point and an actuator, it is necessary to know this identifier or at least to isolate the actuator so that it alone can be addressed at least in a learning phase. The issue is commonplace in the case of wireless communication, particularly radio communication.

It is, moreover, very useful to identify the location of each mobile screen in the building in order to create management areas with which the actuators are associated in groups, so as to allow, for example, for automatic operations according to time or climate data.

A first method of identifying an actuator is described in the patent EP1274199. According to this patent, a product that is normally controlled by radio may, in a learning phase, also be controlled or configured from the mains, through interruptions to the power supply voltage. A specific power supply voltage outage sequence thus makes it possible to identify a single actuator, so long as it has a power supply line dedicated to it and that the installer can access. In practice, there are numerous installations for which this method is difficult to implement.

A second method is described in the patent application EP1410360. During a learning or configuration phase, the radio receivers of the actuators not yet paired with a control point or blank receivers, are ordered randomly or semi-randomly (for example by using dichotomy trees), so as not to react simultaneously to a command. The method can be iterated if necessary if two actuators react simultaneously. The aim is therefore to isolate one actuator out of n in the installation, in order to pair it, as soon as it is individually identified, with a control point.

The method may be relatively lengthy when it is an installation in a tertiary building comprising several tens of actuators. Moreover, the pairing is usually a final step in the configuration of an installation, in particular in tertiary installations, where the remote controls are actually put in place only at the time of handover of the industrial building.

A third method is described in the patent application EP1576430. In this application, the identification code of an actuator is written on the casing of the actuator or marked on the enclosure that conceals the actuator (for example by virtue of a self-adhesive label). It must then be input, manually or using an input tool (for example a barcode scanner). The labels can be repositioned on a schematic drawing of the installation for the pairing to be carried out subsequently.

Other patent applications on the same subject, such as, for example, DE202005019992, propose putting in place identification code reading means using various technologies: RFID, barcodes, ultrasounds, IR, etc.

In practice, none of these solutions is actually acceptable: the impact on production and distribution is a brake on their use, all the more so in the particular case where the distribution and sales channels for the actuators and the control points are differentiated. The various solutions are not necessarily compatible, the choice of one technology on the actuator side and another on the control side involving the need for a number of common reading and gateway tools. The technologies that enable the identification code of the actuator to be read when the latter is entirely concealed facilitate logistics, but necessarily add to the cost of the installation.

There is therefore a need for a solution for identifying and locating solar protection screens and the actuators that correspond to them in a building that is simple, reliable and quick.

The aim of the invention is to provide a configuration method that remedies the above drawbacks and enhances the configuration methods known from the prior art. In particular, the invention makes it possible to implement a configuration method that is simple, reliable, quick and intuitive.

The method according to the invention makes it possible to configure at least a part of a home automation installation comprising a plurality of mobile screens arranged at openings of a building, the screens being driven by actuators identified by an identifier. The method comprises the following steps:

a) a step of constructing a first list of identifiers of actuators of the installation,
b) a step of locating all the locations of the screens that make up the part of the installation to be configured,
c) a step of associating a list of possible actuator identifiers with each screen location,
d) a step of transmitting a movement control command to each actuator of a group of actuators defined by some of the identifiers of the first list,
e) a step of designating locations that correspond to a group of screens that have reacted to the control command and/or that are located in a determined position on completion of the movement command,
f) a step of updating the lists of possible actuator identifiers for each location, the steps d) to f) being reiterated as long as at least one list of possible actuator identifiers for a screen location comprises more than one actuator identifier.

The step of locating the set of screen locations that make up the part of the installation to be configured may comprise a step of generating a schematic or graphic representation of the location of the screens of the part of the installation to be configured.

The step of designating locations that correspond to a group of screens that have reacted to the control command or that are located in a determined position on completion of the movement command may comprise a step of pointing to the latter in the graphic representation.

The graphic representation of the location of the screens may include at least two screen positioning options and the pointing may simultaneously designate the location of the screen and the positioning of the screen.

The graphic representation may comprise icons that represent the mobile screens and these icons may be able to be moved to ensure a visual resemblance between the installation part to be configured and the graphic representation.

The group of actuators receiving the control command in the step d) may be defined randomly during a first application of the step d), for example the number of actuators of the group is at least substantially equal to half the number of identifiers in the first list.

During a reiteration of the step d), the group of actuators may be defined according to the lists obtained on completion of the step f).

When the list of possible actuator identifiers for a location contains only a single identifier on completion of the step f), the actuator that corresponds to this identifier may be excluded from the group of actuators likely to receive a control command during a subsequent execution of the step d).

The configuration method may comprise a step of excluding identifiers of actuators of the installation that do not belong to the part of the installation to be configured.

The configuration method may comprise an information step during which the installer enters data relating to the installation part and to the location of screens relative to the latter.

The installation part to be configured may consist of the set of mobile screens of one and the same façade and/or one and the same floor of the building.

The steps a) to f) may be reiterated for different parts of the building to be configured.

In the step d), the movement control command transmitted may not be the same for all the actuators of the group of actuators defined by a part of the identifiers of the first list and, in the step e), the locations that correspond to the actuators of the set that have reacted to a command and the command to which they have reacted may be designated.

According to the invention, the configuration device comprises hardware means and/or software means, particularly a human-machine interface with input means and display means, a memory, a processing logic unit, information reception means and means for generating and transmitting control commands, for applying the configuration method defined previously, particularly the iterations of the steps a), c), d) and f) of the configuration method defined previously.

The invention also relates to a computer program comprising a computer program code suitable for implementing the steps of the configuration method defined previously, when the program is executed on a computer.

The invention will be better understood on reading the following description, given only as an example and with reference to the appended drawings in which.

Figure 1:
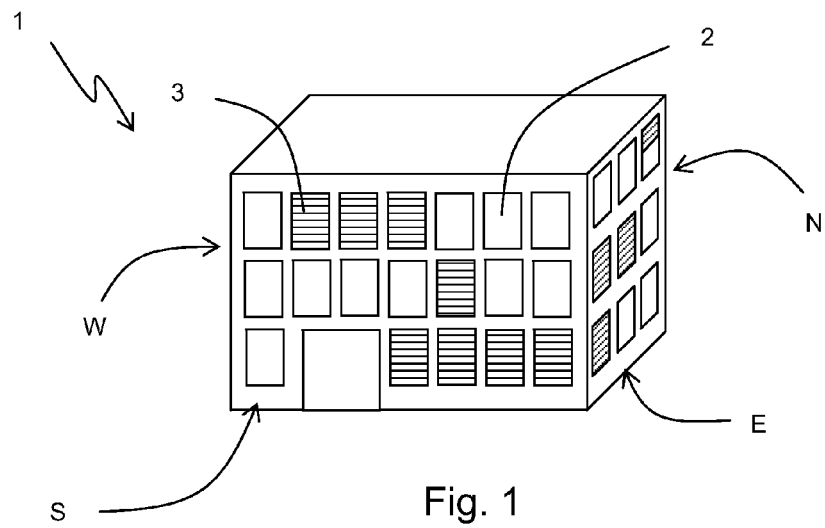
FIG. 1 represents a building in which a configuration method according to the invention can be implemented.

An office building 1, represented in FIG. 1, comprises a plurality of openings (particularly windows) 2 arranged on façades S, E, N, W (the last two not being visible). The openings are equipped with mobile screens 3, particularly shutters, blinds or solar protection screens, some of them being represented in the closed position by horizontal shading on the S and E façades.

The mobile solar protection screens are each driven by an actuator 12, the latter making it possible to automatically open and close the screen. The actuators are generally concealed in rails or enclosures when they are installed and are then difficult to access from inside or outside the building.

Figure 2:
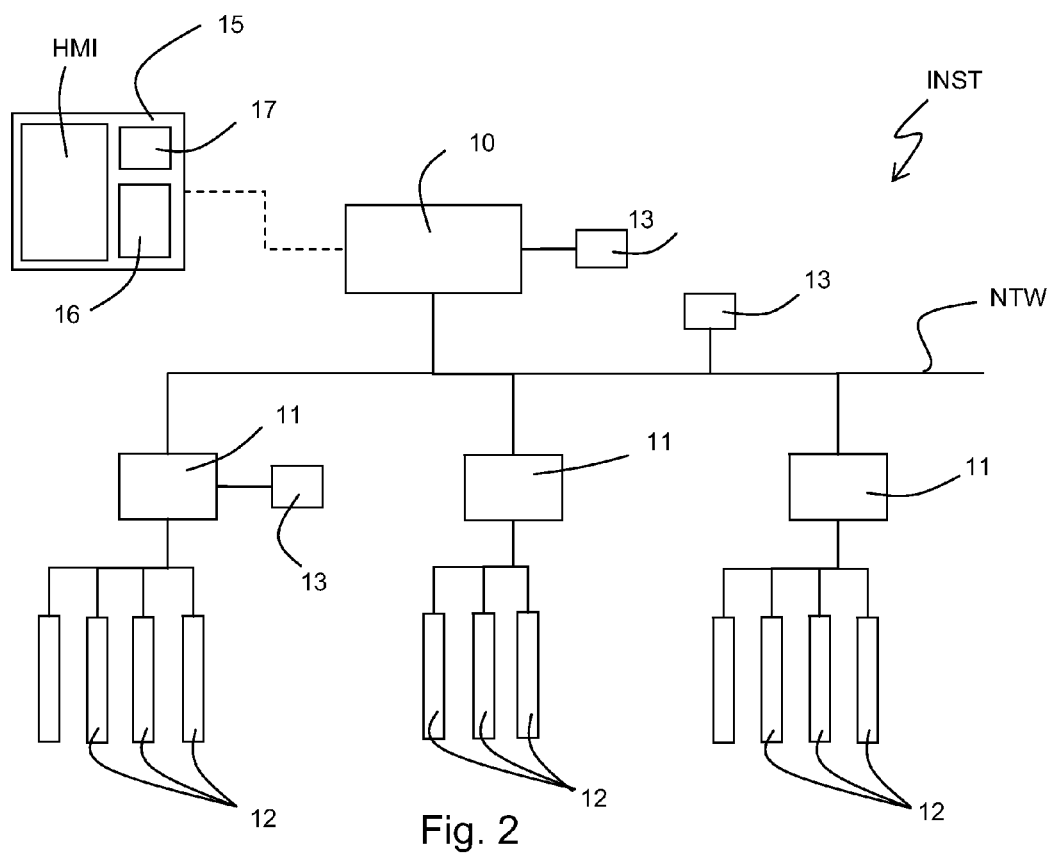
FIG. 2 represents a home automation installation in which a configuration method according to the invention can be implemented.

The automation of the building, particularly of the screens via their actuators 12, based on the presence of a central control means 10, local control means 11 and various sensors 13 (presence, brightness, temperature, etc.), makes it possible to manage parameters of building particularly comfort parameters such as the temperature in the building. For this, the various equipment items (actuators, control means, sensors) communicate with one another via NTW wireless (radio particularly) or wired (wired buses, bearer currents) networks. An exemplary installation is represented in FIG. 2.

The term "actuator" used in this application particularly includes the electronic or electromechanical part used to control the movement of the screen or control the state of a load, for example of a lamp, but also the electronic means of communication with the various other equipment items of the installation.

To drive each actuator, it is necessary for the control means to be able to know an identification code or identifier specific to each actuator. @i denotes the identification code or the identifier of an actuator i. Hereinafter, an identifier or an identification code will be designated by the term "identifier".

During an installation, or prior to it, it is possible to set an actuator individually, without needing to know its identifier. Setting an actuator individually means configuring the extreme or end-of-travel movement positions, its rotation direction or other parameters necessary to its operation on the site of installation linked with the screen or the screens that it drives. The setting may take place in the factory, possibly when the actuator is integrated in the structure of the screen that it will drive.

The invention is preferably applied when the installation INST is set up on the site, that is to say, when the mobile screens are installed at the openings of the building.

Figure 3:
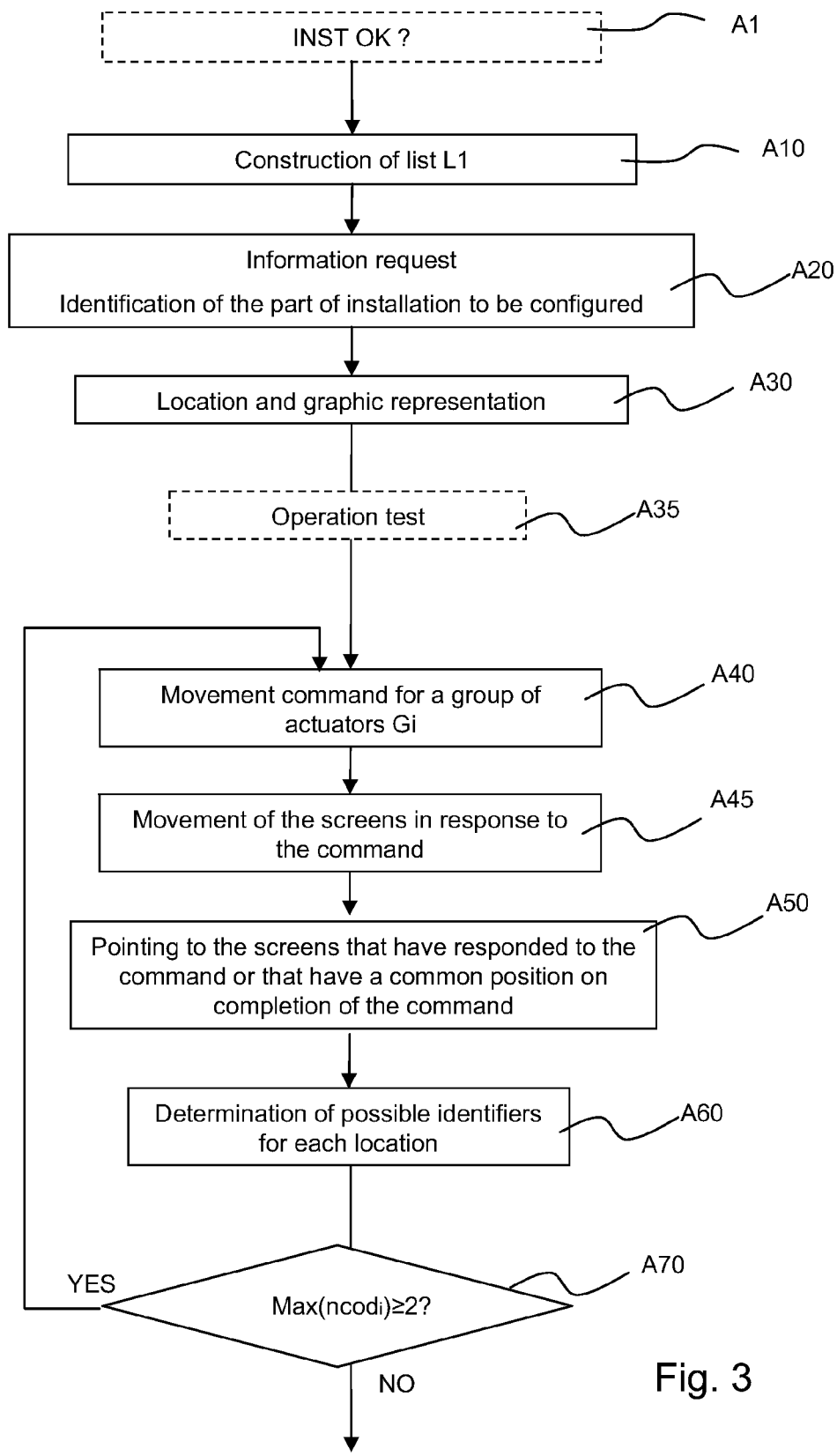
FIG. 3 represents a flow diagram of a first mode of execution of a configuration method according to the invention.

A first simple embodiment of the configuration method according to the invention is described hereinbelow with reference to FIG. 3. It is implemented by a configuration device or configuration means 15 comprising computer means, such as an HMI interface (screen and means of interaction with the latter, for example a mouse or touch panel), computation means 16, such as a processing logic unit, and means 17 of sending and receiving information and commands. The configuration means 15 may be a PC, a PDA or a tool dedicated to the configuration of such an installation. It is connected to the network directly or via one of the control means, by wire or wirelessly.

During an optional step A1, the configuration means requires a validation of the following conditions:
 the actuators of the façade are set,
 the actuators are powered.

During a step A10, an identification request is initiated by the configuration means, for example a message is sent to the actuators of the installation and particularly those of the façade to be configured. The actuators, at least those not yet located in the installation, then each supply at least their identifier to the configuration means. A file of parameters relating to each actuator, for example containing at least its type (that is to say, what type of home automation equipment, for example what type of screen, it is intended to drive), may also be transmitted by each actuator at this stage or subsequently. This procedure is known by the term "Discovery".

A list of the actuators is then constructed or created in the configuration means. In practice, the list of the actuators comprises:
- either the identifiers of the sole actuators of the façade. This case corresponds particularly to a wiring of the different actuators per façade, planned for during installation of the wired network.
- or the identifiers of the various actuators responding to the identification request. In the case of a bidirectional radio installation, actuators other than those of the chosen façade will also respond to the request. On completion of the step A10, the configuration means therefore displays the number of actuators that have provided their identifier.

A first list L1 is thus constructed with the identifiers recovered by the configuration means. Each identifier of the list is the identifier of a given actuator of the installation.

During a step A20, the configuration means displays some information requests concerning physical criteria of the building and of the façade, for example of the type:
- what is the location of the façade (request that then makes it possible to model the entire building)?
- how many floors equipped with automated screens does the façade have?
- how many openings are there on each floor?
- possibly, how many mobile screens are present on the façade or in the installation?

The method is based on a first identification of the openings. Specifically, the method being based on observation of the façade (seen from outside or seen from inside), it is easier to reason in terms of openings, the actuators themselves being concealed. While the method according to the invention is being carried out, the installer must observe movements or positions of the mobile screens at the various openings and not the actuators themselves. In practice, it is possible to reason on the basis of the openings or the actuators.

The installer responds to these information requests in order to go on to the next step of the method.

The preceding step A20 is used to define a list of locations for the various screens of the façade to be configured. Thus, in this step, an identification of the set of the locations of the screens that make up the part of the installation be configured is made. The configuration means assigns each location a unique reference. The subsequent steps of the method will make it possible to make a single actuator identifier correspond to each location reference.

According to the responses in the preceding step A20, the configuration means implements and displays on a screen 30 of the human-machine interface HMI of the configuration means, in a first screen area 24, a graphic representation of the locations of the screens with which the windows or openings of the façade are equipped during a step A30. This graphic representation may be schematic. Each screen with which an opening is equipped is identified, for example, by a square icon 20 on the screen, the screens of a floor being represented on one and the same line, the successive floors being represented on consecutive lines. The dimension of the icons is suitable to allow the set of the openings of the façade to be displayed in the first area of the screen. Each icon represents a location of a screen and therefore a location that corresponds to an actuator operating this screen.

Figure 4:
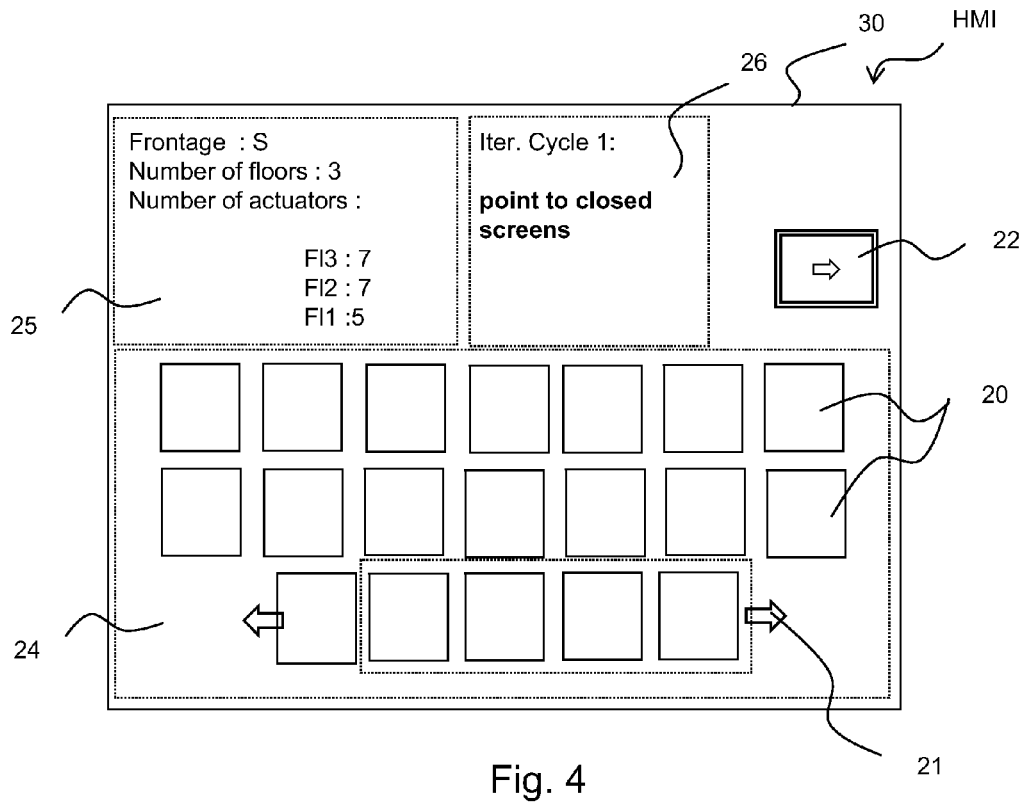
FIGS. 4 to 6 are schematic representations of a human-machine interface screen of a configuration device used to implement the configuration method according to the invention.

The schematic representation, in the form of an icon matrix, symbolically represents an overview of the openings of the façade and therefore of the screens and actuators. It is represented in FIG. 4 et seq. A second screen area 25 reviews the physical criteria of the façade to be configured, a third screen area 26 the instructions of the various configuration steps.

Preferably, the installer has the possibility of moving some icons so as to obtain a schematic representation that is as close as possible to the distribution of the openings on the façade. Thus, the presence of doors, the shifting of the openings on the façade from one floor to another or any other particular feature of the façade can be taken into account in this schematic representation. This possibility is symbolized by the presence of arrows 21 indicating the movement of one or more icons.

Each icon, and therefore each screen location, has associated with it, for example in a memory, a list of the possible identifiers of the actuator driving this screen. At this stage, the list of the possible identifiers corresponds to the set of the identifiers of the actuators of the first list.

During an optional step A35, a test routine for the various actuators is implemented, so as to check whether all the actuators of the façade are operating correctly. The routine may comprise an actuation command corresponding to a movement to a particular position, for example 30% closure, addressed to the set of the actuators of the first list. On completion of the actuation command i.e when the execution of the actuation is completed, the installer may simply validate if all the actuators have operated. The screens can then be driven to their open position.

During a step A40, the configuration means selects from the first list L1, at least one first group G1 of mobile screens to which it will transmit an actuation control command, for example a movement control command to a closed position. This first group of actuators G1 therefore corresponds to a first sublist SL1 of actuator identifiers. At this stage of the method, the configuration means does not know where the mobile screens are located on the façade and it even does not know whether the mobile screens are located on the façade. The first sublist corresponds to a random portion of the first list, preferably approximately half of the first list.

The actuators that have received the actuation command place the screens in the particular position required by the actuation command (for example, top end-of-travel or bottom end-of-travel) or perform the movement required by the command. The objective of this step A45 is to enable the user to easily visually identify which actuators have reacted to the command that has just taken place or which screens are placed in a predefined position, for example the closed position. This position is indicated to the installer in the third screen area.

Figure 5:
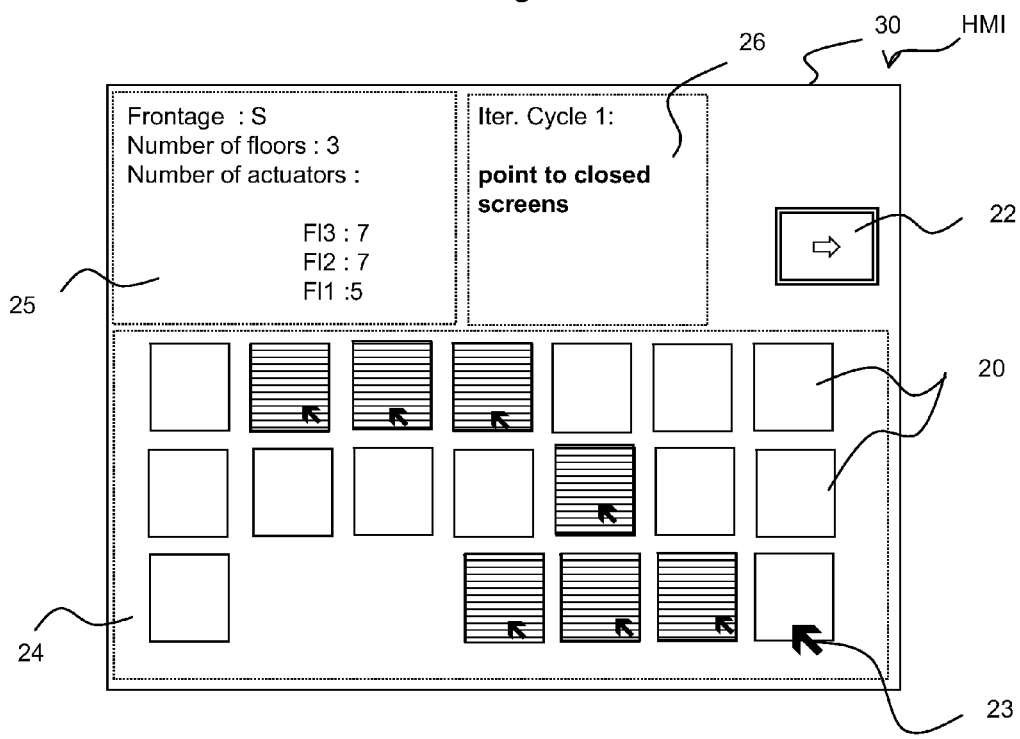

During a step A50, the installer visually identifies, on the façade, the screens placed in the predefined particular position. Following this identification, the installer identifies then designates the locations that correspond to the screens that have reacted to the control command or that are located in a determined position on completion of the movement command, i.e. when the execution of the movement is completed. This designation may be performed by pointing, on the human-machine interface of the configuration means, to the icons associated with the screens. This step is schematically represented in FIG. 5, corresponding to the configuration of the façade S as it appears in FIG. 1: the angled pointing arrows 23 symbolize the pointing action of the installer on the icons associated with the openings for which the screens are placed in a closed position. These arrows are represented smaller once the pointing action is finished. Once pointed to, the icons, or at least their appearance, may be modified, for example by symbolizing the positioning of the screen in a closed position. In FIG. 5, the selected icons are shaded. A simple change of colour may also enable the installer to easily check the correlation between the façade and its graphic representation on the interface of the configuration means. Pointing once again to one of the icons makes it possible to deselect the latter, in order to correct a possible error.

Once this step is finished, the installer validates his pointing actions to go on to the next step, by pointing, for example, to a validation arrow 22. During the step A60, the configuration means uses the results of the preceding steps to update, for each screen location, the list of possible actuator identifiers. To do this, the configuration means crosses the list of the possible identifiers that correspond to each location and the list of the identifiers of the actuators that have responded to the command.

In practice, the locations actually identified by pointing to the corresponding icons have corresponding identifiers of actuators that necessarily belong to the first sublist of identifiers, that one of the actuators to which the command was addressed. The first sublist therefore becomes the list of possible identifiers for the locations identified during this step A50 by the installer. For the remaining locations, the list of the possible identifiers corresponds to the first list excluding the identifiers of the first sublist.

Alternatively, and preferably, the configuration means selects from the first list at least three groups of actuators to which it will transmit different actuation commands, for example a movement command to an open position, an actuation command to a closed position and no command, the three groups being separate but complementary. The screens associated with the actuators that do not receive any actuation command remain in their preceding position, as do those for which the actuation command corresponds to their present position. This alternative makes it possible to increase the chances of determining, for each opening located on the screen of the configuration means, just one possible identifier. It therefore makes it possible to speed up the location process, not only in terms of location of the actuators but it also makes it possible to save in response times in that it avoids a step of returning the screens of the façade to a determined initial position.

Then, in a step A70, the number of possible identifiers $ncod_i$ is tested for each location of the installation part to be configured. If $max(ncod_i) \geq 2$, the method then loops to the step A40.

During the reiteration of the step A40, the configuration means determines a second sublist SL2 of identifiers, that is to say, a second group G2 of actuators to which it sends a command, for example a movement command to an open position. The second sublist can be determined randomly, but it is preferable for it to take account of the first sublist. The second sublist may partially overlap the first sublist, preferably it overlaps it by half. In the case where it comprises all the identifiers of the list complementing the first sublist, the exclusion of the unassigned identifiers (that is to say those belonging to actuators that do not belong to the installation part to be configured) is simplified. This exclusion may also be put back to the subsequent steps, by gradually constructing a list of the unassigned identifiers. The second sublist then preferably contains half the identifiers of the first sublist and half the identifiers of this complementary list.

Alternatively and preferentially, the configuration means selects from the first list at least three groups of actuators to which it will transmit different actuation commands, the three groups being separate but complementary. The screens associated with the actuators that do not receive any actuation command remain in their preceding position, as do those for which the actuation command corresponds to their current position.

Previously, all the identified actuators may have received a command to return to a default position to simplify the display of the movements of the screens on the façade. If no command to return to a default position is provided, it is preferable for the command supplied to the actuators of the second sublist to be a command that is differentiated from the command supplied to the actuators of the first sublist during the previous iteration.

With no systematic return to a default position, the relationship with the position of the screen in the preceding step, identified by the installer, may make it possible to isolate by chance a small number of identifier possibilities for some actuators. Thus, it is possible that the configuration method converges more rapidly towards the desired solution, namely: determining a single possible actuator identifier per location.

During a new step A50, the user then identifies which screens are placed in a predefined position, indicated to the installer in the third screen area, for example the closed position. The method then returns to the step A60.

This second iteration of the steps A40 to A 60 makes it possible to substantially refine the search for association between a location and an actuator identifier. By cross-referencing the results obtained during the first and second iterations, the lists of possible identifiers for each location reduce substantially by half.

It is, however, possible that, by chance, a single actuator identifier is quickly assigned to a location (or several locations in the case where the actuator simultaneously drives a number of screens placed in front of separate openings). In this case, the location method is also accelerated, this identified actuator and its identifier being set aside from the sublists of actuator identifiers.

The steps A40 to A60 are reiterated, as long as an (integer) number of identifiers $ncod_i$ in the list of the possible identifiers for at least one location i is greater than or equal to 2.

For a simple case for which the actuators of the first list correctly correspond to the set of actuators of the façade to be configured, the maximum number of iterations during the method described is deduced from the number of identifiers to be assigned by the following mathematical relationship:

Maximum number of iterations=$n$ for a number of identifiers between $2^{n-1}$ and $2^n$.

A second more sophisticated embodiment further reduces the maximum number of iterations needed to associate each location with the various actuators of the façade.

Figure 6:
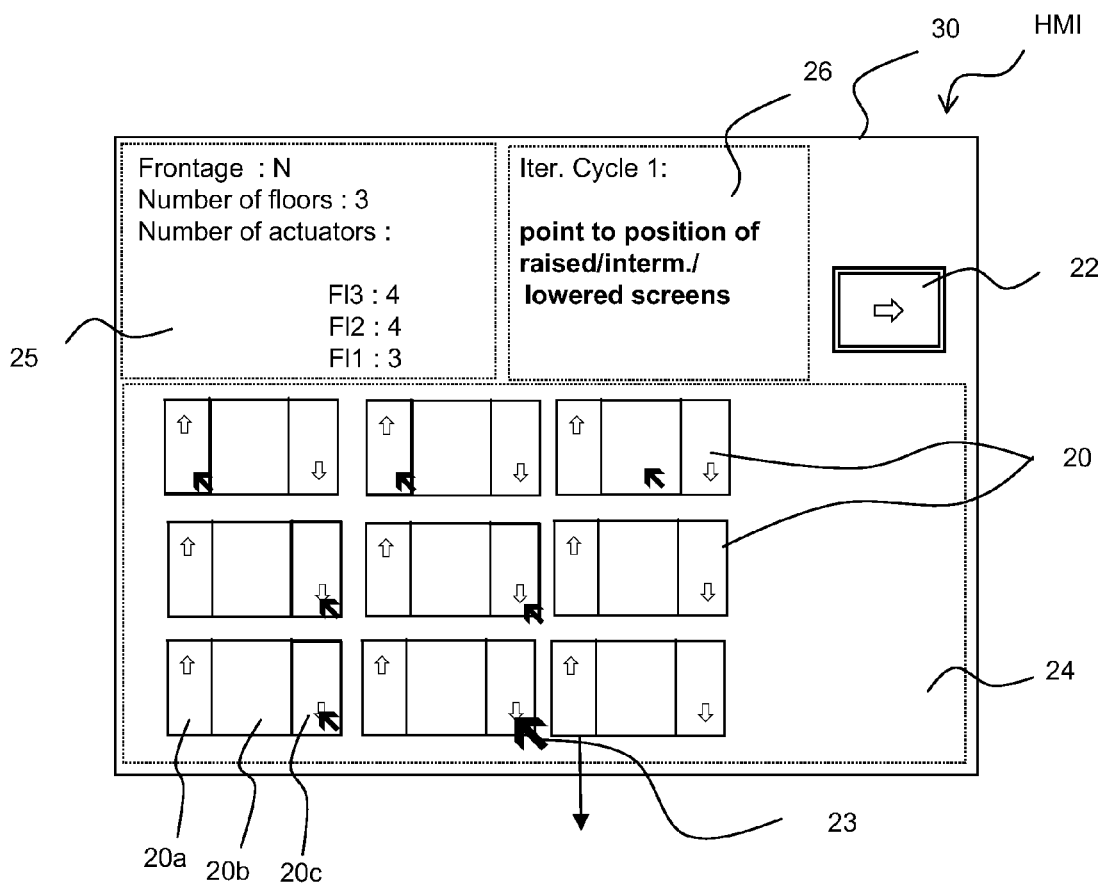
Figure 7:
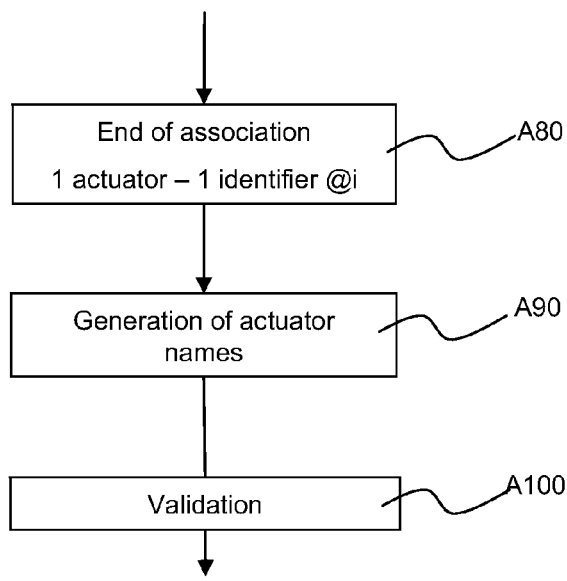
FIG. 7 represents a flow diagram of an end-of-configuration procedure for a installation part.

In the latter, the actuators can receive more specific positioning commands, for example to a first extreme position, a second extreme position and an intermediate position. This embodiment is represented in FIG. 6 during a step A50 for configuring the façade N.

The icons of the schematic graphic representation of the windows or openings of the façade are then divided into 3 cells 20a, 20b, 20c, one for each position (the raised and lowered positions being symbolized by the right and left cells with upward-pointing or downward-pointing arrows, a median position being represented by the central cell) and the installer identifies and points to the actual position of the screen in the cell representing the screen. The various positions can also be symbolized by a vertical distribution of the cells.

The convergence towards the unique location of each actuator is thus favoured, the number of cycles for reiteration of the steps A40-A60 is reduced.

This embodiment is ideal for the installation of small tertiary sector buildings comprising 2 to 5 floors. For higher buildings, the first embodiment is preferred. In practice, an installer standing outside the building at the foot of the façade may not be able to clearly distinguish between an extreme position and an intermediate position, in particular for the upper floors.

Preferentially, the configuration means offers the installer the choice of the various embodiments, that he can thus select in a manner suited to the building to be configured.

Other embodiments can be combined with those described previously, while remaining within the scope of the invention.

The intermediate position described previously may be a position of deployment of the screen to mid-travel between the extreme positions, but it may also correspond to an open position of the slats of a deployed venetian blind, the extreme position then corresponding to the venetian blind deployed with slats closed.

A third embodiment, similar to the preceding one, may provide movement commands to several intermediate positions in addition to the extreme positions.

A fourth embodiment may comprise a step of short to-and-fro movement of the screen (or opening-closure of the slats of a venetian blind) following a command during the step A40. This movement may be repeated by the actuators to help the installer identify the screens that have received the command.

This embodiment, also better suited to small buildings, provides a configuration time saving on the command response times, that is to say, on the movement times of the screens from one position to another.

When the configuration means has determined a single possible actuator identifier for each location, an end-of-configuration message is supplied systematically to the installer. The various icons are all marked as identified. They are also identified with the location references supplied by the configuration means.

It is possible for two or more openings to correspond to one and the same actuator, the two corresponding icons may then have a common reference which is assigned to them on completion of the method.

After this end-of-association step A80, the installer is prompted to name the various actuators during a step A90. It is thus possible to assign them an intuitive name, dependent, for example, on an identification on a drawing of the building (room 3.2—blind 1, for example). A final step A100 validates the location of the actuators and puts in place the organization of the network, by the transfer of communication keys for example, and the locking of the actuators, which will no longer respond to a new Discovery request.

The individual location of the actuators and the learning of their positioning on the façade make it possible to create management areas, to associate sensors, control points to the various actuators, and to do so without access to the actuators.

A graphic representation of each configured façade is also possible.

The method described therefore offers many advantages and an appreciable simplicity of implementation compared to the state of the art.

When it is not possible for the installer to view the complete façade, the method described above is perfectly applicable from inside the building. In this case, the installer must go from room to room to identify the screens that have moved following the location command. Viewing from inside the building is also necessary in the case of indoor blinds and façades with tinted windows.

Preferentially, the configuration is carried out by two installers, one situated outside the building and the other inside. The notation of the actuators relative to a drawing simplifies communication between the two installers given that their viewpoints are different (right-left reversed).

In the case where the installation is modified (change of an actuator, expansion of the installation), it is sufficient to renew the implementation of the method. The only actuators not identified are flagged and the method runs rapidly. In the case of a change of actuator, the new identifier is exchanged with the identifier previously assigned to the icon of the façade.

The above description relates to the configuration of a building one façade at a time. However, it is perfectly possible to configure a building differently, for example floor by floor. Particularly, when it is a building being built, the various mobile screens may have been installed in the openings of the building without the partitions having been put in place. Thus, in the same way as for an installer placed outside and looking at a façade, it is then perfectly possible and simple to move to the centre of a floor and have a panoramic view of the openings.

The graphic representation on the configuration means may be slightly different: a number of lines of icons may be displayed, corresponding to the openings of the floor, with mention of the orientation of the façades to which they belong.

The preceding method was described for a case in which the actuators can transmit an identifier (for example, in the case where the actuators are equipped with a bidirectional receiver, which enables them to send and receive information or actuators wired to a bidirectional wired network). However, it is also applicable to the case of unidirectional actuators, that is to say actuators that include only a unidirectional receiver capable of receiving information but not sending it. In this case, the various actuators are paired previously with the configuration means or with a local control means capable of communicating with the configuration means bidirectionally. They have therefore exchanged a particular information item that allows an individual dialogue between the local control means and the actuator (in particular, the central control means has supplied each actuator with a specific identifier). These particular information items are included in the first list of identifiers.

The way the method according to the invention proceeds, based on this first list, also makes it possible to determine the location of the unidirectional actuators on the façade or at floor level. Once the association between actuators and locations is finished, the configuration means artificially assigns the unidirectional actuators in place in the installation part to be configured a virtual serial number or a virtual identifier that makes it possible to differentiate them.

The links between these virtual identifiers and the location of the actuators on the façade are therefore established in a way that is very similar to the links between the actual identifiers and the so-called bidirectional actuators of the installation. These two methods are complementary and may be applied together, if the installation comprises actuators with one-way receivers and also those with bidirectional receivers.

In practice, the method may use a step for discovery of the identifiers of the bidirectional actuators and an option to add to the first list may then be offered to the installer.

The number of actuators and the number of openings are not necessarily linked: on the one hand, it is commonplace, in dynamic building façade installations for tertiary use, for one and the same actuator to simultaneously drive a number of screens (covering several openings), and on the other hand, it is possible to find two screens (mostly of different types, installed inside and outside) for one and the same opening.

When the openings or at least some openings are equipped with an indoor screen and an outdoor screen, it is necessary to implement the method according to the invention twice: once for the indoor screens and once for the outdoor screens. Alternatively, if the building is such that it allows for an operation of the outdoor and indoor screens to be distinguished from one and the same view point, each icon may be split into 2 to represent the indoor/outdoor screen options for each opening. It is also possible for the method to be performed simultaneously by two installers who communicate and mutually validate the identifications. Each location corresponds in all cases to a single mobile screen.

The invention claimed is:

1. A method comprising:
    configuring at least a part of a home automation installation comprising a plurality of mobile screens arranged at openings of a building, the plurality of mobile screens being driven by actuators identified by an identifier, the configuring comprising:
        a) constructing a first list of identifiers of actuators of the installation,
        b) locating all the locations of the plurality of mobile screens that make up the part of the installation to be configured,
        c) associating a list of possible actuator identifiers with each screen location of the plurality of mobile screens,
        d) transmitting a movement control command to each actuator of a group of actuators defined by some of the identifiers of the first list,
        e) designating locations that correspond to a group of screens of the plurality of mobile screens that have reacted to the control command and/or that are located in a determined position on completion of the movement command,
        f) updating the lists of possible actuator identifiers for each location,
    the configuring comprising d) to f) being reiterated as long as at least one list of possible actuator identifiers for a screen location of the plurality of mobile screens comprises more than one actuator identifier.

2. The configuration method according to claim 1, wherein the locating the set of screen locations the plurality of mobile screens that make up the part of the installation to be configured comprises generating a graphic representation of the location of the plurality of the mobile screens of the part of the installation to be configured.

3. The configuration method according to claim 2, wherein the designating locations that correspond to the group of screens of the plurality of mobile screens that have reacted to the control command or that are located in a determined position on completion of the movement command comprises pointing to the latter in the graphic representation.

4. The configuration method according to claim 3, wherein the graphic representation of the location of the plurality of mobile screens includes at least two screen positioning options and wherein the pointing simultaneously designates the location of a screen of the plurality of mobile screens and the positioning of a screen of the plurality of mobile screens.

5. The configuration method according to claim 2, wherein the graphic representation comprises icons that represent the plurality of mobile screens and wherein these icons can be moved to ensure a visual resemblance between the installation part to be configured and the graphic representation.

6. The configuration method according to claim 1, wherein the group of actuators receiving the control command in d) is defined randomly during a first application of d).

7. The configuration method according to claim 1, wherein, during a reiteration of d), the group of actuators is defined according to the lists obtained on completion of f).

8. The configuration method according to claim 1, wherein when the list of possible actuator identifiers for a location contains only a single identifier on completion of f), the actuator that corresponds to this identifier is excluded from the group of actuators to receive a control command during a subsequent execution of d).

9. The configuration method according to claim 1, wherein the method comprises a excluding identifiers of actuators of the installation that do not belong to the part of the installation to be configured.

10. The configuration method according to claim 1, wherein the method comprises entering, during installation, data for the installation part and to the location of the plurality of mobile screens relative to the latter.

11. The configuration method according to claim 1, wherein the installation part to be configured consists of the plurality of mobile screens of one and the same façade and/or one and the same floor of the building.

12. The configuration method according to claim 1, wherein steps a) to f) are reiterated for different parts of the building to be configured.

13. The configuration method according to claim 1, wherein, in d), the movement control command transmitted is not the same for all the actuators of the group of actuators defined by a part of the identifiers of the first list and wherein, in e), the locations that correspond to the actuators of the set that have reacted to a command and the command to which they have reacted are designated.

14. A configuration device, in particular a computer, comprising hardware means and/or software means, particularly a human-machine interface with input means and display means, a memory, a processing logic unit, information reception means and means for generating and transmitting control commands, of applying the configuration method according to claim 1, particularly the iterations of a), c), d) and f) of claim 1.

15. A computer program comprising a computer program code means suitable for implementing the configuration method according to claim 1, when the program is executed on a computer.

* * * * *